United States Patent
Prock et al.

(10) Patent No.: US 9,167,586 B1
(45) Date of Patent: Oct. 20, 2015

(54) INTERFERENCE MITIGATION AT CELL EDGE REGION OF ENHANCED NODE B OF LTE WIRELESS NETWORK

(71) Applicant: Sprint Communications Company L.P., Overland Park, KS (US)

(72) Inventors: John W. Prock, Peculiar, MO (US); Jasinder Pal Singh, Olathe, KS (US); Maulik K. Shah, Overland Park, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 91 days.

(21) Appl. No.: 13/965,899

(22) Filed: Aug. 13, 2013

(51) Int. Cl.
*H04W 4/00* (2009.01)
*H04W 72/08* (2009.01)

(52) U.S. Cl.
CPC .................................. *H04W 72/082* (2013.01)

(58) Field of Classification Search
None
See application file for complete search history.

(56) References Cited

U.S. PATENT DOCUMENTS

| 2007/0189332 | A1 | 8/2007 | Phan et al. |
| 2010/0027502 | A1 | 2/2010 | Chen et al. |
| 2011/0085508 | A1 | 4/2011 | Wengerter et al. |
| 2011/0090854 | A1 | 4/2011 | Montojo et al. |
| 2011/0110316 | A1 | 5/2011 | Chen et al. |
| 2011/0122860 | A1 | 5/2011 | Guan et al. |
| 2012/0058791 | A1* | 3/2012 | Bhattad et al. ............... 455/509 |
| 2012/0063405 | A1 | 3/2012 | Han et al. |
| 2012/0163202 | A1* | 6/2012 | Aguirre et al. ............... 370/252 |
| 2012/0163291 | A1* | 6/2012 | Zhu et al. ..................... 370/328 |
| 2012/0178462 | A1* | 7/2012 | Kim ............................. 455/450 |
| 2012/0252470 | A1 | 10/2012 | Wong et al. |
| 2014/0133411 | A1* | 5/2014 | Park et al. .................... 370/329 |
| 2014/0328309 | A1* | 11/2014 | Comstock .................... 370/329 |

FOREIGN PATENT DOCUMENTS

| EP | 2312879 | 4/2011 |
| EP | 2524466 | 7/2011 |
| WO | 2011088144 | 7/2011 |

OTHER PUBLICATIONS

U.S. Appl. No. 13/005,210, filed Jan. 12, 2011.

* cited by examiner

*Primary Examiner* — Kibrom T Hailu (57) ABSTRACT

An enhanced Node B (eNB) and method for interference mitigation at a cell edge region in a Long Term Evolution (LTE) wireless network are provided. The eNB in one example embodiment includes a transceiver system for communicating with a User Equipment (UE) registered with the eNB and a processing system coupled to the transceiver system and configured to receive a signal strength and an interference information from the UE via the transceiver system, with the processing system configured to determine if the UE is located at a cell edge region of the eNB, determine if the UE is experiencing interference, and allocate by Resource Elements (REs) in the communications being transferred from the eNB to the UE if the UE is located at the cell edge region and if the UE is experiencing an unacceptable level of interference.

6 Claims, 6 Drawing Sheets

INTERFERENCE MITIGATION AT CELL EDGE REGION OF ENHANCED NODE B OF LTE WIRELESS NETWORK

TECHNICAL FIELD

Aspects of the disclosure are related to the field of communications, and in particular, a LTE wireless network.

TECHNICAL BACKGROUND

Wireless communication systems, such as cellular voice and data networks, typically include multiple wireless access nodes spread over a geographic area. As a result, wireless communication devices can register at various wireless access nodes and access communication services. In many examples, the wireless communication devices are mobile, and can move between wireless coverage areas of the wireless access nodes.

The Long Term Evolution (LTE) protocol (also known as Evolved Universal Terrestrial Radio Access Network, or E-UTRAN) is a wireless communication protocol developed from GSM and 3GPP cellular communication standards. LTE is the first GSM/3GPP standard that is fully IP and packet-based, and can be fully integrated into 2G and 3G cellular infrastructure.

LTE was developed to provide improved performance and better spectral efficiency to cellular networks. LTE supports high data rates for services such as voice over IP (VOIP), streaming multimedia, videoconference, and high-speed cellular modem services. LTE supports flexible carrier bandwidths as well as Time Division Duplex (TDD) and Frequency Division Duplex (FDD) communication modes. LTE was designed with a scalable carrier bandwidth from 1.4 megahertz (MHz) to up to 20 MHz. The bandwidth that is used depends on the frequency band and the amount of spectrum available to a network operator.

LTE uses the concept of a Resource Block (RB), which is a block of 12 subcarriers in one slot. A transport block is a group of RBs with a common modulation/decoding. The physical interface is a transport block, which corresponds to the data carried in an allocated period of time for a particular wireless device in communication with a wireless communication network.

LTE typically assigns communication resources to a User Equipment (UE) in units of one RB, which has a bandwidth of 180 kilohertz (KHz). Each RB contains twelve Resource Elements (REs). The minimum transmit time range for LTE is the transmit time interval (TTI), which equals one millisecond (ms). For a voice-over-LTE call (VoLTE), the UE transmits a new voice packet at intervals of every 16 ms. Reverse link packets are transmitted in only four frames out of sixteen, with a resulting duty cycle of twenty-five percent, resulting in a 6 dB degradation in coverage for voice calls. The typical bandwidth of the voice decoder and encoder of a VoLTE call is 12.2 KHz. Therefore, assigning a minimum of 180 KHz of bandwidth to a telephone call is unnecessary and wastes resources.

OVERVIEW

Systems and methods for interference mitigation at a cell edge region in a Long Term Evolution (LTE) wireless network are provided herein. In one example, an enhanced Node B (eNB) for interference mitigation at a cell edge region in a Long Term Evolution (LTE) wireless network includes a transceiver system for communicating with a User Equipment (UE) registered with the eNB and a processing system coupled to the transceiver system and configured to receive a signal strength and an interference information from the UE via the transceiver system, with the processing system configured to determine if the UE is located at a cell edge region of the eNB, determine if the UE is experiencing interference, and allocate by Resource Elements (REs) in the communications being transferred from the eNB to the UE if the UE is located at the cell edge region and if the UE is experiencing an unacceptable level of interference.

In an example of an interference mitigation method for interference mitigation at a cell edge region of an eNB of a LTE wireless network, the method includes the eNB determining if a UE registered with the eNB is located at the cell edge region of the eNB, the eNB determining if the UE is experiencing interference, and the eNB allocating by REs in the communications being transferred from the eNB to the UE if the UE is located at the cell edge region and if the UE is experiencing an unacceptable level of interference.

In another example of an interference mitigation method for interference mitigation at a cell edge region of an eNB of a LTE wireless network, the method includes the eNB comparing a signal strength of a UE to a predetermined signal strength threshold, the eNB determining that the UE is located at the cell edge region if the signal strength is less than the predetermined signal strength threshold, the eNB receiving interference information and generating an interference value from the interference information, the eNB comparing the interference value to a predetermined interference threshold, the eNB determining that the UE is experiencing interference if the interference value is less than the predetermined interference threshold, and the eNB allocating by REs in the communications being transferred from the eNB to the UE if the UE is located at the cell edge region and if the UE is experiencing interference.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
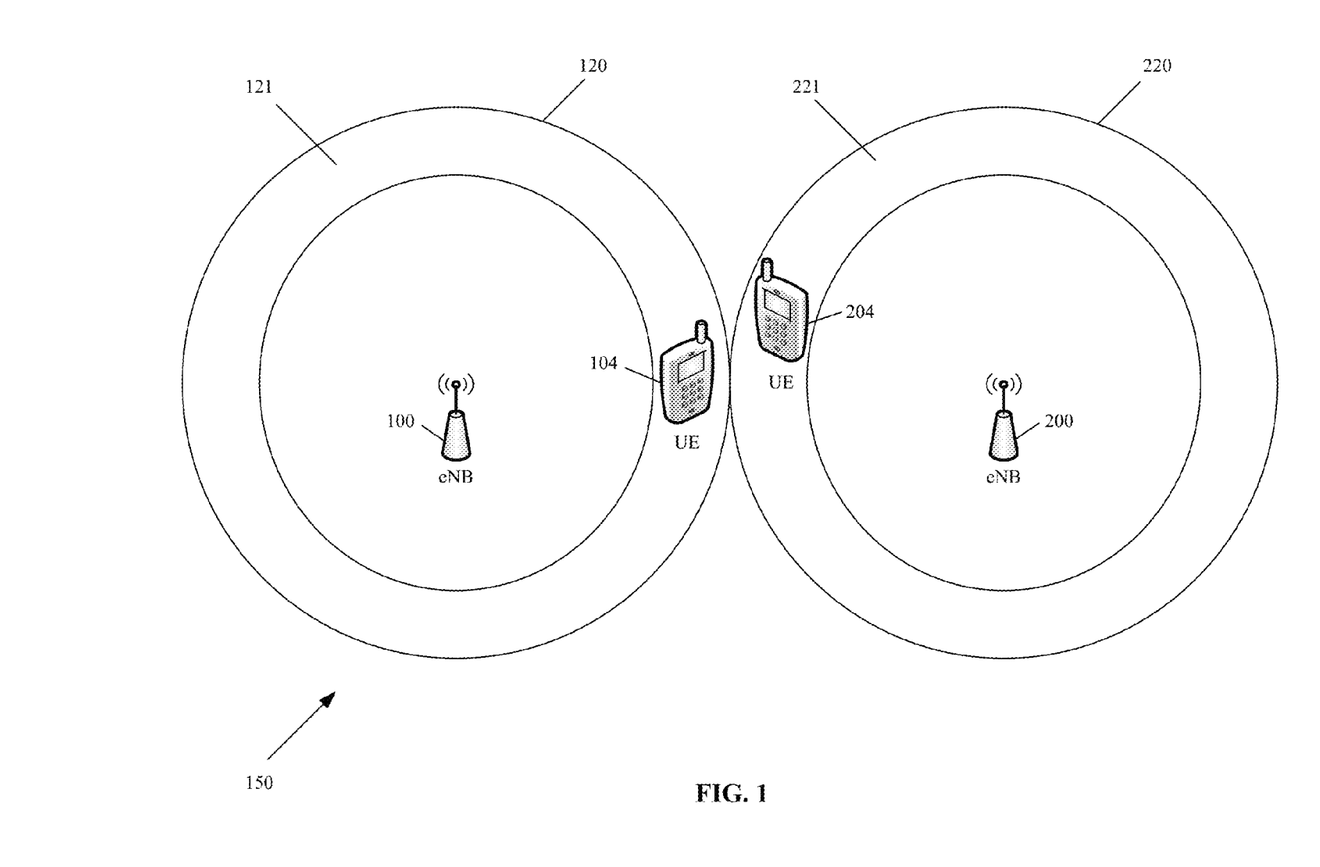
FIG. 1 shows an exemplary Long-Term Evolution (LTE) wireless network.

FIG. 1 shows an exemplary Long-Term Evolution (LTE) wireless network 150. The LTE wireless network 150 includes at least a first enhanced Node B (eNB) 100 and a second eNB 200. The second eNB 200 is physically adjacent to the first eNB 100, as shown. The eNBs 100 and 200, and other devices of the wireless network 150, exchange communications using a LTE wireless communication protocol or a Voice Over LTE (VoLTE) wireless communication protocol, for example. The first eNB 100 includes a cell coverage area 120 and the second eNB 200 includes a cell coverage area 220.

The eNBs 100 and 200 comprise evolved base stations that control and wirelessly communicate with mobile devices or User Equipment (UEs) 104 and 204. The UEs 104 and 204 are within the respective cell coverage areas 120 and 220 and are registered with the respective eNBs. The eNBs 100 and 200 perform operations including registering UEs, conducting communications between UEs, and conducting communications between UEs and other communication links, devices, or systems, including IP networks, telephone landlines, and other communication devices and systems.

The UEs 104 and 204 comprise wireless communication devices. The UEs 104 and 204 include mobile devices that can move within the eNB cell coverage areas. The UEs 104 and 204 can move between eNB cell coverage areas.

The UE 104 can monitor wireless conditions in relation to the eNB 100, including a received signal strength, a quantified noise level, a signal to noise (S/N) ratio, a signal to interference (S/I) ratio, a Channel Quality Indicator (CQI), or other indicator of signal strength or signal quality. Consequently, the UE 104 can transmit such values to the eNB 100.

It is a problem when the UE 104 is operating at a cell edge region of the cell coverage area 120. The cell edge region may comprise an outer area 121 of the cell coverage area 120. When operating within the cell edge region, the UE 104 will likely experience low signal strengths. The UE 104 will likely experience low signals strengths in both the forward link from the eNB 100 to the UE 104 and in the reverse link from the UE 104 to the eNB 100. Further, the UE 104 is more likely to experience interference when operating in the cell edge region, wherein the interference can become significantly large in comparison to forward link and reverse link signals.

In the figure, a neighbor eNB 200 is located substantially adjacent to the cell coverage area 120 of the eNB 100. The cell coverage area 220 of the neighbor eNB 200 may approach or even overlap the cell coverage area 120 of the eNB 100. Consequently, interference in the UE 104 may be greater at the cell edge region, not only because the signal strength of the eNB 100 is weak, but also because of the presence of the neighbor eNB 200 and associated neighbor UEs 204.

The eNB 100 sends communications that are allocated as Resource Blocks (RBs), wherein a single RB comprises twelve Resource Elements (REs). The eNB 100 monitors the communications with the UE 104 and is capable of switching from allocating communications to the UE 104 from a RB-based allocation to a RE-based allocation. The eNB 100 monitors a location of the UE 104 and determines when the UE 104 is at a cell edge region of the cell coverage area 120. In addition, the eNB 100 monitors interference in the UE 104 and determines when the UE 104 is experiencing interference. Interference above a predetermined threshold is considered to be significant. The UE 104 is considered to be experiencing interference when the interference exceeds a predetermined threshold.

When the UE 104 is determined to be at the cell edge region and is determined to be experiencing interference, the eNB 100 is configured to change the allocation scheme. When the UE 104 is determined to be at the cell edge region and is determined to be experiencing interference, the eNB 100 is configured to allocate REs for communications with the UE 104, instead of allocating entire RBs. Allocating by REs in one example comprises selecting one or more REs to avoid interference from communication devices near the cell edge region. For example, the allocating can choose REs for the UE 104 that avoid interference from the UE 204 of the neighboring eNB 200, wherein the neighbor UE 204 is near the cell edge region of the first eNB 100. This may be especially relevant where the neighbor UE 204 is in the cell edge region of the cell coverage area 220 of the second eNB 200.

The change in allocation can be performed on forward link communications from the eNB 100 to the UE 104. The change in allocation can be performed on reverse link communications from the UE 104 to the eNB 100. As a result of the allocating, the REs for the UE 104 are distributed across multiple RBs, as is shown in FIGS. 3B and 3C and the accompanying discussion.

LTE typically assigns communication resources to the UE 104 at the minimum of one RB, which has a bandwidth of 180 KHz. Each RB contains twelve REs. The minimum transmit time range for LTE is the transmit time interval (TTI), which equals one millisecond (ms). For a voice-over-LTE call (VoLTE), the UE transmits a new voice packet at intervals of every 16 ms. Reverse link packets are transmitted in only four frames out of sixteen, with a resulting duty cycle of twenty-five percent, resulting in a 6 dB degradation in coverage for voice calls. The typical bandwidth of the voice decoder and encoder of a VoLTE call is 12.2 KHz. Therefore, assigning a minimum of 180 KHz of bandwidth to a telephone call is unnecessary and wastes resources.

In contrast, the eNB 100 in the figure assigns resources in a different manner when the UE 100 is at the cell edge region and is experiencing interference. When the UE 100 is at the cell edge region and is experiencing interference, the eNB 100 allocates resources to a telephone call by units of REs, each of which have a 15 KHz bandwidth. This enables up to six voice calls to be transported in a RB and a one hundred percent duty cycle can be achieved.

When a UE is at the edge of the cell, it is recommended that the UE will report a minimum channel quality indicator (CQI) of 4. This requires two resource elements of 15 KHz each, for a total of 30 KHz. Of the available 30 KHz bandwidth, only 24 KHz will be needed for transporting voice symbols, so the remaining REs of the available bandwidth can be reserved for overhead messaging and signaling. Fewer REs are needed for calls closer to the cell, which will have more robust modulation schemes, allowing more calls per RB.

In some examples, the eNB 100 can allocate at least two REs to voice calls, giving a voice call 30 KHz of bandwidth. However, a voice call may need only about 24 KHz of bandwidth. Consequently, the excess 4 KHz of bandwidth capacity can be used for signaling purposes, i.e., for communication overhead.

Moreover, the 24 KHz is only needed for the CDMA equivalent of full rate frames. Voice traffic also includes one-eighth, one-quarter, and one-half rate frames, for example. Such frames can be concatenated around the overhead channels. Consequently, there can be up to six simultaneous VoLTE calls transported in a single RB, increasing the VoLTE coverage by 6 dB and increasing the carrying capacity by up to four times.

Figure 2:
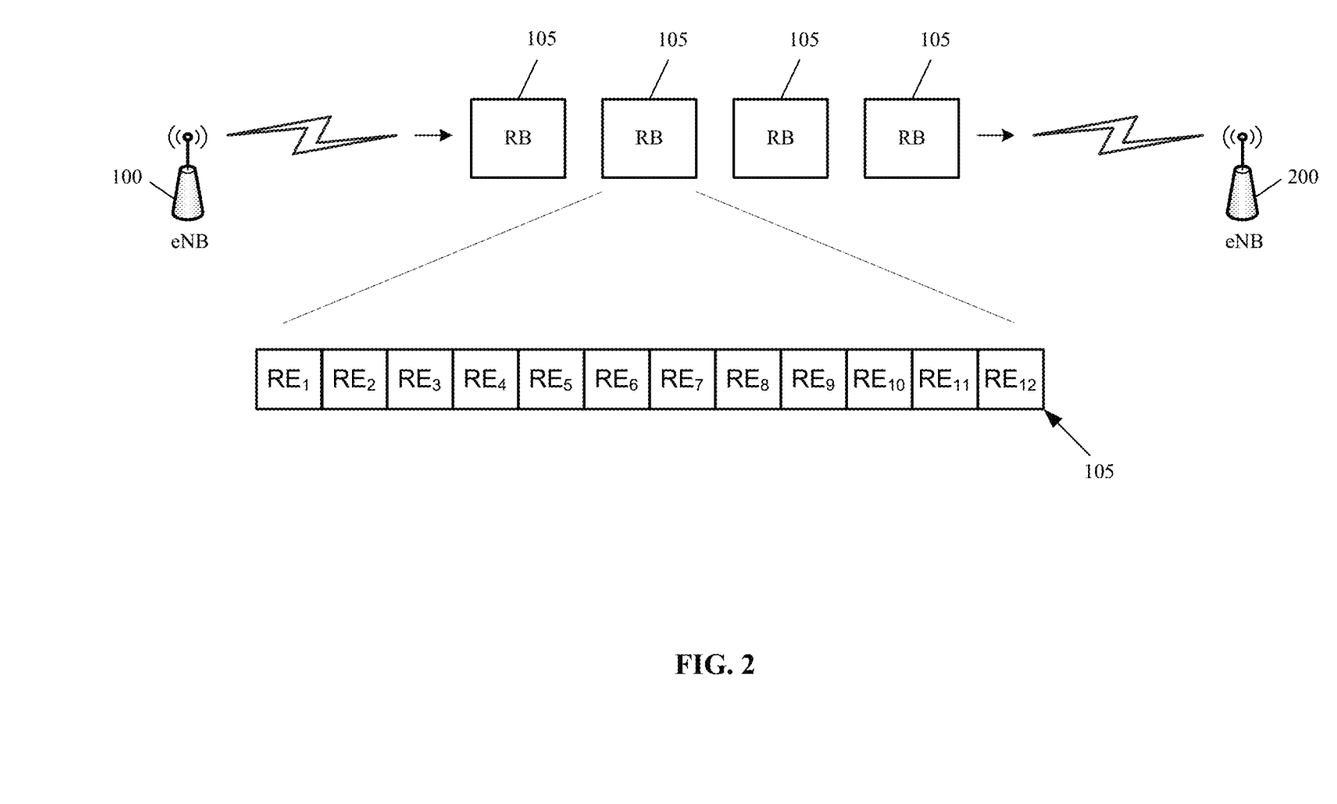
FIG. 2 shows an example LTE communication, wherein a first enhanced Node B (eNB) is sending information to a second eNB in a series of LTE Resource Blocks (RBs).

FIG. 2 shows an example LTE communication, wherein the first eNB 100 is sending information to the second eNB 200 in a series of LTE Resource Blocks (RBs) 105. The information being transmitted from the first eNB 100 to the second eNB 200 is distributed across multiple RBs 105 and transferred from the first eNB 100 to the second eNB 200 in the multiple RBs 105.

In voice telephone calls, the RBs 105 are not fully utilized. LTE commonly assigns communication resources to a UE at the minimum of one RB. Assigning a minimum of 180 KHz of bandwidth to a telephone call is unnecessary and wastes resources.

Figure 3A:
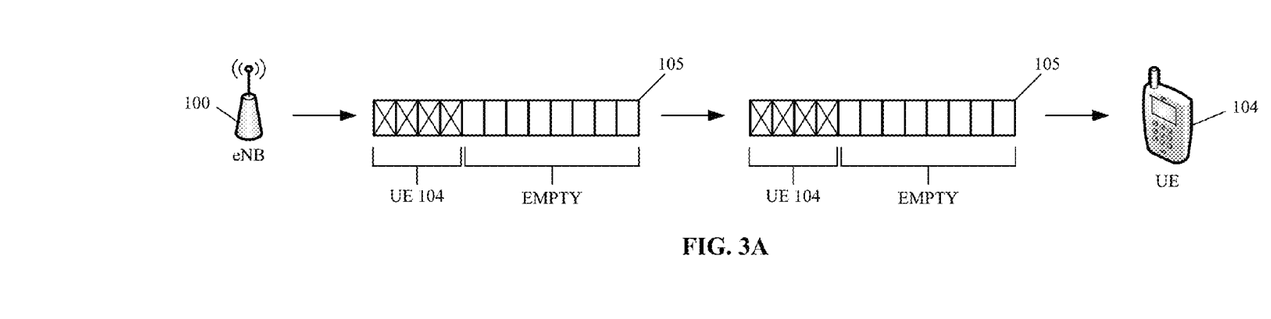
FIGS. 3A-3C show examples of RB and Resource Element (RE) allocations.
Figure 3B:
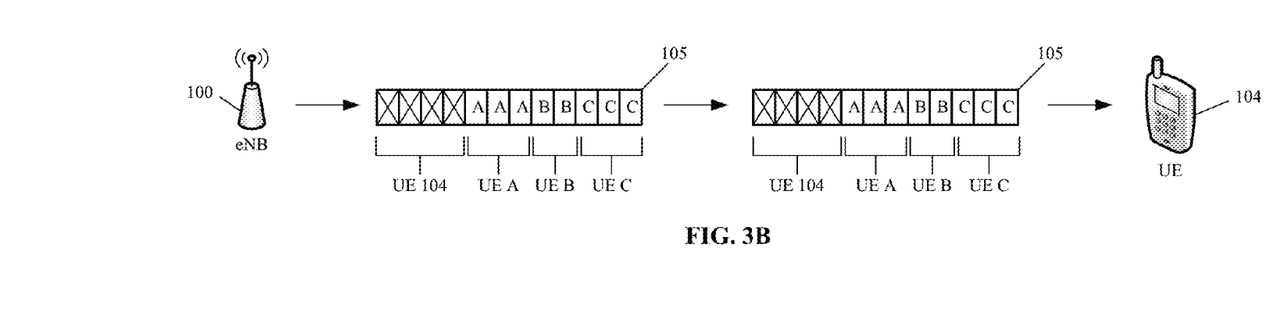
Figure 3C:
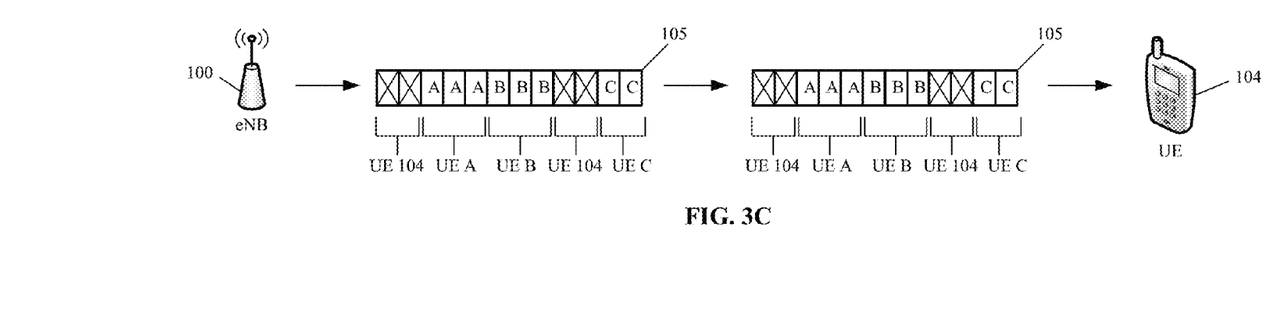

FIG. 3A shows an example of the RB allocation that is typically used in LTE and VoLTE communications as shown in FIG. 2. The figure shows that the eNB 100 is transmitting a series of RBs 105 to the UE 104. Because the voice call does not use all of the capacity of the RBs 105, it can be seen that only four REs of each RB 105 are being utilized, for example. The remaining eight REs of each RB 105 are empty.

FIG. 3B shows a RE allocation of the eNB 100 where the UE 104 is in a cell edge region and is experiencing interference. In this example, the RBs 105 are again transporting four REs to the UE 104. However, because the eNB 100 is allocating REs and not entire RBs, the remaining eight REs of the RBs 105 can be utilized for other communications. For example, in the figure three REs are allocated to and are being used to transport data to UE A, two REs are allocated to and are being used to transport data to UE B, and three REs are allocated to and are being used to transport data to UE C. It should be understood that some or all of the remaining eight REs can be allocated to other devices, but it is not required that all remaining eight REs be allocated and used.

FIG. 3C shows a RE allocation of the eNB 100 where the UE 104 is in a cell edge region and is experiencing interference. In this example, the RBs 105 are again transporting four REs to the UE 104. However, in this example the REs are distributed or spaced-apart within the RB 105. One or more REs allocated to other devices can be interspersed between REs allocated to the UE 104, as shown. This example further distributes the energy of the communication to the UE 104.

Figure 4:
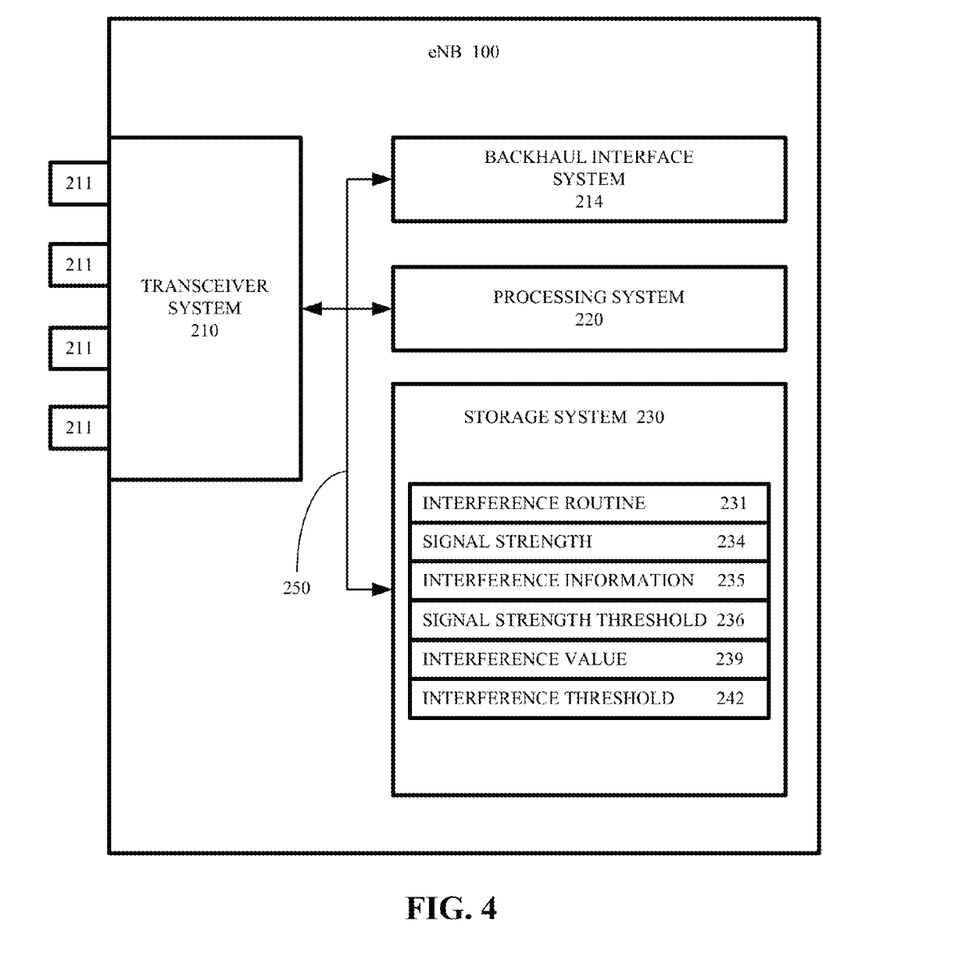
FIG. 4 shows an exemplary eNB.

FIG. 4 shows an exemplary eNB 100. The eNB 100 includes a transceiver system 210, a backhaul interface system 214, a processing system 220, and a storage system 230. In operation, the processing system 220 is operatively linked to the transceiver system 210, the backhaul interface system 214, and the storage system 230, such as by a bus 250, for example. It should be understood that alternatively discrete links can be employed, such as network links or other circuitry. The eNB 100 can be distributed or consolidated among the equipment or circuitry that together form the elements of the eNB 100. The eNB 100 can optionally include additional devices, features, or functionality not discussed here for purposes of brevity.

The transceiver system 210 comprises one or more communication interfaces for communicating with one or more UEs, namely multiple transceiver nodes 211. The transceiver system 210 operates the transceiver nodes 211 to conduct wireless communications with the UE 104, coordinate handoffs of the UEs 104 with eNBs or other devices or systems, exchange authentication or authorization information with other communication networks, and provide data and/or parameters to one or more UEs 104.

The backhaul interface system 214 includes a network interface for communicating with one or more communication networks, such as wire and/or wireless communication systems. Examples of the backhaul interface system 214 include network interface card equipment, transceivers, modems, and other communication circuitry. In addition, the backhaul interface system 214 can communicate with external devices. The backhaul interface system 214 provides command and control information and instructions to the processing system 220 or to the transceiver system 210. The backhaul interface system 214 can change data in the storage system 230 and can affect the operation of the processing system 220 and the operation of the eNB 100.

The storage system 230 comprises computer-readable storage media that is readable by the processing system 220 and capable of storing information. In one example, the storage system 230 stores an interference routine 231, a signal strength 234, an interference information 235, a signal strength threshold 236, an interference value 239, and an interference threshold 242.

The signal strength 234 comprises a measured or reported signal strength. The signal strength measurements can comprise the signal strength of a signal received in the UE 104 from the eNB 100. Alternatively, or in addition, the signal strength measurements can comprise the signal strength of a signal received in the eNB 100 from the UE 100. The signal strength can be used to determine a distance from the eNB 100 to the UE 104. The signal strength can be used to determine a location of the UE 104 with respect to the eNB 100. Consequently, the eNB 100 can determine whether the UE 104 is at a cell edge region of the cell coverage area 120.

The interference information 235 is received from the UE 104. The interference information 235 comprises a measurement or quantification of an interference occurring in the UE 104. The UE 104 can monitor wireless conditions in relation to the eNB 100, including signal strength, signal to noise ratio, signal to interference ratio, energy to interference ratio, a Channel Quality Indicator (CQI) transmitted by the UE 104, or other indicator of signal strength or signal quality. The CQI comprises information regarding communications between the UE 104 and the eNB 100. The UE 104 can transmit such information to the eNB 100 to be stored as the interference information 235.

The signal strength threshold 236 comprises a predetermined signal strength threshold. The signal strength 234 can be compared to the signal strength threshold 236. The signal strength 234 can be compared to the signal strength threshold 236 in order to determine the approximate location of the UE 104 within the cell coverage area 120 of the eNB 100. The location determination does not necessarily pinpoint the actual geographic location of the UE 104 within the cell coverage area 120, but provides at least a displacement distance of the UE 104 from the eNB 100.

In one example, the eNB 100 compares the signal strength to the predetermined signal strength threshold. The predetermined signal strength threshold comprises a value that represents an expected cell edge signal strength value or that represents an expected signal strength outward beyond an inner boundary of the cell edge region. If the signal strength is less than the predetermined cell edge signal strength threshold, then the eNB 100 determines that the UE 104 is located at a cell edge region.

The interference value 239 comprises an interference level of the interference occurring at the UE 104. The eNB 100 generates the interference value 239 from the signal strength 234 and the interference information 235 in one example. The eNB 100 in one example generates the interference value 239 as a ratio of the signal strength to a noise level. Alternatively, the interference value 239 comprises a ratio of the signal strength to a S/N ratio or a S/I ratio. In yet another example, the interference value 239 comprises a ratio of the signal strength to the CQI of the UE 104. In yet another alternative, the interference value 239 can comprise a signal strength measurement performed when no actual communications are being exchanged between the UE 104 and the eNB 100.

The interference threshold 242 comprises a predetermined interference threshold. The interference threshold 242 comprises a value representing a maximum allowable interference level in the cell coverage area 120.

The interference value 239 is compared to the interference threshold 242. The interference value 239 is compared to the interference threshold 242 in order to determine the amount of interference at the UE 104. If the interference value 239 is less than the interference threshold 242, then the eNB 100 determines that the UE 104 is experiencing an interference level that could disrupt communications.

The eNB 100 determines that interference with communications is likely if the UE 104 is both located in a cell edge region 120 and significant interference is occurring in the UE 104. The eNB 100 subsequently allocates the REs of RBs in order to space apart the communication elements being sent from the eNB 100 to the UE 104 and mitigate interference in the UE 104.

The interference routine 231 can be implemented in program instructions and among other functions which can, when executed by the eNB 100 in general or the processing system 220 in particular, operates to direct the eNB 100 or the processing system 220 to determine if a UE registered with the eNB is located at the cell edge region of the eNB, determine if the UE is experiencing interference, and allocate by REs in the communications being transferred from the eNB to the UE if the UE is located at the cell edge region and if the UE is experiencing an unacceptable level of interference.

In some embodiments, the interference routine 231 when executed by the eNB 100 in general or the processing system 220 in particular operates to direct the eNB 100 or the processing system 220 to compare a signal strength of a UE to a predetermined signal strength threshold, determine that the UE is located at the cell edge region if the signal strength is less than the predetermined signal strength threshold, compare an interference value to a predetermined interference threshold, determine that the UE is experiencing interference if the interference value is less than the predetermined interference threshold, and allocate by REs in the communications being transferred from the eNB to the UE if the UE is located at the cell edge region and if the UE is experiencing interference.

Figure 5:
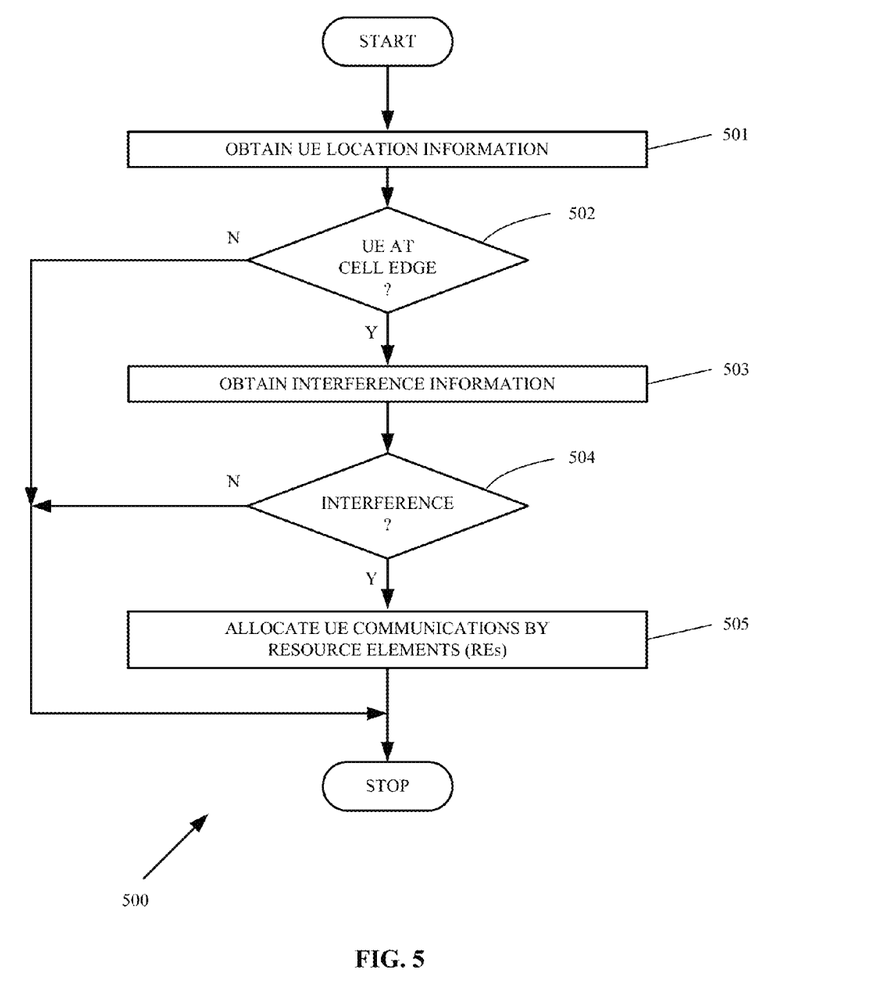
FIG. 5 is a flowchart of an exemplary interference mitigation method for interference mitigation at a cell edge region of an eNB of a LTE wireless network.

FIG. 5 is a flowchart 500 of an exemplary interference mitigation method for interference mitigation at a cell edge region of an eNB of a LTE wireless network. In step 501, the eNB obtains a UE location of a UE within the cell coverage area of the eNB. The UE location in some examples comprises a physical distance or displacement from the eNB, and does not comprise an exact geographical location within the cell coverage area. The UE location comprises a location quantification of whether the UE is near a cell edge region of the cell coverage area.

In step 502, the eNB determines whether the UE is at a cell edge region of the cell coverage area using the obtained UE location. The cell edge region may comprise a substantially annular outer area of the cell coverage area where the cell coverage area comprises substantially a circular area. If the UE is determined to be at the cell edge region, then the method proceeds to step 503. Otherwise, where the UE is not determined to be at the cell edge region, the method exits.

In step 503, where the UE is determined to be within the cell edge region of the eNB, the eNB obtains UE interference information from the UE. The UE interference information can comprise a measured or quantified interference level, including a measured noise level, a S/N ratio, or a CQI, as previously discussed.

In step 504, the eNB determines whether the UE is experiencing significant interference from the UE interference information. The eNB can determine whether the UE is experiencing significant interference by comparing the measured or quantified interference level to a predetermined interference threshold. If the UE is experiencing significant interference, then the method proceeds to step 505. Otherwise, where the UE is not experiencing significant interference, the method exits.

In step 505, the eNB determines that the UE is at the cell edge region and the UE is experiencing significant interference. The eNB therefore allocates UE communications by REs. The RE allocation mitigates interference in the UE, but while conserving REs and not wasting carrying capacity.

Figure 6:
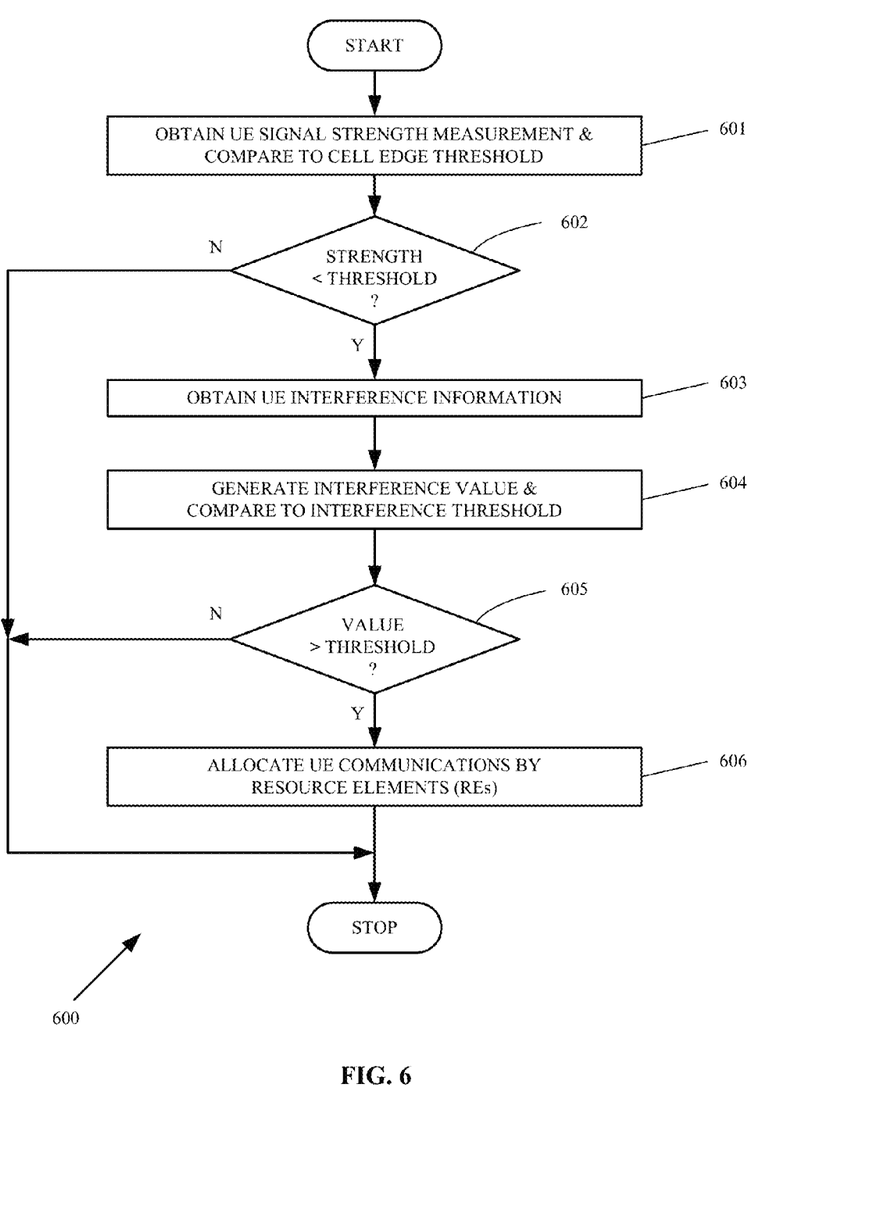
FIG. 6 is a flowchart of another exemplary interference mitigation method for interference mitigation at a cell edge region of an eNB of a LTE wireless network.

FIG. 6 is a flowchart 600 of another exemplary interference mitigation method for interference mitigation at a cell edge region of an eNB of a LTE wireless network. In step 601, the eNB obtains a UE signal strength from the UE and compares the UE signal strength to a predetermined cell edge signal strength threshold. The eNB can determine whether the UE is within a cell edge region by determining a location of a UE within the cell coverage area of the eNB. More specifically, the eNB can determine the distance of the UE from the eNB by comparing the UE signal strength to the predetermined cell edge signal strength threshold.

In step 602, if the UE signal strength is less than the predetermined cell edge signal strength threshold, then the UE is determined to be at the cell edge region. If the UE signal strength is less than the predetermined cell edge signal strength threshold, then the method proceeds to step 603. Otherwise, where the UE is not determined to be at the cell edge region, the method exits.

In step 603, where the UE is determined to be within the cell edge region of the eNB, the eNB obtains UE interference information from the UE, as previously discussed. The UE interference information can comprise a measured or quantified interference level, including a measured noise level, a S/N ratio, a S/I ratio, or a CQI, as previously discussed.

In step 604, the eNB generates an interference value from the interference information and compares the interference value to a predetermined interference threshold. In one example, the interference value comprises a ratio of UE signal strength to noise level. In another example, the interference value comprises a ratio of signal strength to a S/N ratio or a S/I ratio. In yet another example, the interference value comprises a ratio of signal strength to a CQI value. However, other interference values and interference value formulations are contemplated and are within the scope of the description and claims.

In step 605, if the interference value is greater than the predetermined interference threshold, then the eNB determines that the UE is experiencing interference. If the interference value is greater than the predetermined interference threshold, then the method proceeds to step 606. Otherwise, where the UE is not experiencing significant interference, the method exits.

In step 606, the eNB has determined that the UE is at the cell edge region and the UE is experiencing significant interference. The eNB therefore allocates UE communications by Resource Elements (REs), as previously discussed.

The eNBs 100 and 200 can provide communication services including voice calls, text messages, data access, or other communication services provided over cellular or wireless communication networks. In some examples, the eNBs 100 and 200 include equipment to provide wireless access within different coverage areas, to route communications between content providers and user devices, and to facilitate handoffs between UEs within different coverage areas, among other operations.

The eNBs 100 and 200 may communicate with the UEs 104 and 204 using a variety of frequencies and a variety of communication schemes. The eNBs 100 and 200 can provide multiple sectors of wireless coverage. It should be understood that any number of eNBs can be included in a wireless communication system.

The eNBs 100 and 200 comprise RF communication and control circuitry, transceivers, and antennas, as well as wireless communications equipment capable of communicating with and providing wireless access within a wireless coverage area to communication services for wireless communication devices, such as the UE 104. The RF communication circuitry typically includes amplifiers, filters, RF modulators, transceivers, and signal processing circuitry. The eNBs 100 and 200 may include processing equipment, routing equipment, and physical structures. The eNBs 100 and 200 may include transceiver and antenna equipment for exchanging wireless communications with UEs 104 in a sector of wireless coverage. Further equipment, networks, and/or systems can be communicatively coupled to the eNBs 100 and 200, such as equipment, networks, and systems of cellular voice and data communication systems (not shown for clarity). It should be understood that the eNBs 100 and 200 can be distributed or consolidated among equipment or circuitry that together forms the elements of the eNBs 100 and 200. The eNBs 100 and 200 can optionally include additional devices, features, or functionality not discussed herein for the purpose of brevity.

The UE 104 may be a mobile device, including a cellular phone, but also may include other devices. The UE 104 may include one or more transceiver portions for communication over one or more wireless links of differing frequency bands. The UE 104 can receive wireless access information from one or more of the eNBs 100 and 200, such as beacon signals, channel information, frequency information, overhead signaling, neighbor lists, and the like. The UE 104 can move among any of the coverage areas associated with the eNBs 100 and 200 and receive wireless access.

The UE 104 can include one or more antennas, transceiver circuitry elements, and communication elements. The transceiver circuitry typically includes amplifiers, filters, modulators, and signal processing circuitry. The UE 104 can also include user interface systems, memory devices, non-transitory computer-readable storage mediums, software, processing circuitry, or some other communication components. The UE 104 can comprise subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

The transceiver nodes 211 of the transceiver system 210 of the eNB 100 each include transceiver equipment for wirelessly exchanging user communications and overhead communications with user devices, omitted for clarity, using antenna arrays and the associated wireless links. The transceiver nodes 211 can comprise one or more antenna elements, RF coupling equipment, structural supports, cabling, or other equipment. In some examples, elements of the transceiver nodes 211 can comprise a directed antenna array, such as a yagi antenna, dish antenna, parabolic antenna, or phased antenna array to establish beam forming during transmissions to user devices.

The processing system 220 of the eNB 100 can comprise one or more microprocessors and other circuitry that retrieves and executes the interference routine 231 from the storage system 230. The processing system 220 can be implemented within a single processing device but can also be distributed across multiple processing devices or sub-systems that cooperate in executing program instructions. Examples of the processing system 220 include general purpose central processing units, application specific processors, and logic devices, as well as any other type of processing device, combinations, or variations thereof.

The storage system 230 of the eNB 100 can comprise any computer readable storage media readable by the processing system 220 and capable of storing the interference routine 231. The storage system 230 can include volatile and nonvolatile, removable and non-removable media implemented in any method or technology for storage of information, such as computer readable instructions, data structures, program modules, or other data.

In addition to storage media, in some implementations the storage system 230 can also include communication media over which the interference routine 231 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The interference routine 231 of the eNB 100 can include additional processes, programs, or components, such as operating system software, database software, or application software. The interference routine 231 can also comprise firmware or some other form of machine-readable processing instructions executable by the processing system 220. In at least one implementation, the program instructions can include first program instructions that direct the processing system 220 to exchange communications with the UE 104 over one or more transceiver nodes 211, among other operations.

In general, the interference routine 231 can, when loaded into the processing system 220 and executed, transform the processing system 220 into a special-purpose computing system configured to exchange communications with UE devices 110 over one or more transceiver nodes, among other operations. Encoding the interference routine 231 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the interference routine 231 can transform the physical state of the semiconductor memory when the program is encoded therein. For example, the interference routine 231 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a Long Term Evolution (LTE) wireless communication network to communicate with User Equipment (UE), the method comprising:
   wirelessly exchanging first voice data using a resource block allocation;
   receiving a Received Signal Strength Indication (RSSI) and a Signal to Interference-plus-Noise Ratio (SINR) for the UE;
   determining if the RSSI for the UE is above a cell-edge proximity threshold;
   if the RSSI for the UE is above the cell-edge proximity threshold, then determining if the SINR for the UE is above a resource element allocation threshold;
   if the SINR for the UE is determined to be above the resource element allocation threshold, then switching the UE from the resource block allocation to a resource element allocation; and
   in response to the switch to the resource element allocation for the UE, allocating individual resource elements to the UE and wirelessly exchanging second voice data using the allocated individual resource elements.

2. The method of claim 1 wherein allocating the resource elements to the UE and wirelessly exchanging the second voice data using the allocated resource elements comprises allocating spaced-apart resource elements to the UE and wirelessly exchanging the second voice data using the allocated spaced-apart resource elements.

3. The method of claim 2 further comprising not allocating resource elements between the allocated spaced-apart resource elements to another UE.

4. A Long Term Evolution (LTE) wireless communication network to communicate with User Equipment (UE), the LTE network comprising:
   an LTE transceiver configured to wirelessly exchange first voice data using a resource block allocation and receive a Received Signal Strength Indication (RSSI) and a Signal to Interference-plus-Noise Ratio (SINR) for the UE;
   an LTE processing system configure to determine if the RSSI for the UE is above a cell-edge proximity threshold;
   if the RSSI for the UE is above the cell-edge proximity threshold, then the LTE processing system configured to determine if the SINR for the UE is above a resource element allocation threshold;
   if the SINR for the UE is above the resource element allocation threshold, then the LTE processing system configured to switch the UE from the resource block allocation to a resource element allocation; and in response to the switch to the resource element allocation for the UE, to allocate individual resource elements to the UE; and
   the LTE transceiver configured to wirelessly exchange second voice data using the allocated individual resource elements.

5. The LTE network of claim 4 wherein:
   the LTE processing system is configured to allocate spaced-apart resource elements to the UE; and
   the LTE transceiver is configured to wirelessly exchange the second voice data using the allocated spaced-apart resource elements.

6. The LTE network of claim 5 wherein the LTE processing system is configured to not allocate resource elements between the allocated spaced-apart resource elements to another UE.

* * * * *